(12) United States Patent
Kavan et al.

(10) Patent No.: US 8,831,919 B2
(45) Date of Patent: Sep. 9, 2014

(54) PHYSICS-INSPIRED UP SAMPLING FOR CLOTH SIMULATION

(75) Inventors: Ladislav Kavan, Salt Lake City, UT (US); Peter-Pike Sloan, Cottonwood Heights, UT (US)

(73) Assignee: Disney Enterprises, Inc., Burbank, CA (US)

( * ) Notice: Subject to any disclaimer, the term of this patent is extended or adjusted under 35 U.S.C. 154(b) by 188 days.

(21) Appl. No.: 13/214,080

(22) Filed: Aug. 19, 2011

(65) Prior Publication Data

US 2013/0046522 A1   Feb. 21, 2013

(51) Int. Cl.
   G06F 17/10    (2006.01)
   G06F 17/16    (2006.01)
   G06T 13/60    (2011.01)
   G06T 17/00    (2006.01)

(52) U.S. Cl.
   USPC .............. 703/6; 703/2; 345/420; 345/428; 345/473

(58) Field of Classification Search
   CPC ....... G06T 2210/16; G06T 7/20; G06T 7/206; G06T 7/2073; G06T 11/00; G06T 13/20; G06T 13/40; G06T 13/60; G06T 17/20; G06T 17/205
   USPC .................................................. 345/473, 474
   See application file for complete search history.

(56) References Cited

U.S. PATENT DOCUMENTS

2011/0273457 A1*   11/2011   De Aguiar et al. ............ 345/474

OTHER PUBLICATIONS

Feng et al., A Deformation Transformer for Real-Time Cloth Animation, ACM Transactions on Graphics, vol. 29, No. 4, Article 108, Publication date: Jul. 2010.*
Kass et al., Animating Oscillatory Motion With Overlap: Wiggly Splines, ACM Transactions on Graphics, vol. 27, No. 3, Article 28, Publication date: Aug. 2008.*
Kavan et al., Physics-Inspired Upsampling for Cloth Simulation in Games, ACM Transactions on Graphics, vol. 30, No. 4, Article 93, Publication date: Jul. 2011.*
Meyer, Carl D., Matrix Analysis and Applied Linear Algebra, Copyright 2000, Society for Industrial and Applied Mathematics.*
Müller et al., Wrinkle Meshes, Eurographics/ACM SIGGRAPH Symposium on Computer Animation, Jul. 2010.*
Zurdo et al., Animating Wrinkles by Example on Non-Skinned Cloth, IEEE Transactions on Visualization and Computer Graphics, vol. 19, No. 1, Jan. 2013.*
Bergou, M., Mathur, S., Wardetzky, M., and Grinspun, E. Tracks: Toward Directable Thin Shells. ACM Transactions on Graphics (SIGGRAPH) 26, 3 (Jul.), 2007, 20:1-50:10.
DeAguiar, E., Sigal, L., Treuille, A., and hodgins, J.K. Stable spaces for real-time clothing. ACM Trans. Graph 29 (Jul.), 2010, 106:1-106:9.

(Continued)

*Primary Examiner* — Kamini S Shah
*Assistant Examiner* — Michael P Healey
(74) *Attorney, Agent, or Firm* — Patterson & Sheridan LLP

(57) ABSTRACT

A technique for physically-based cloth simulation uses linear upsampling operators. The upsampling operators enrich the appearance of a coarse mesh physical cloth simulation. The technique starts by pre-computing the upsampling operators using a pair of coarse and fine training simulations aligned with tracking constraints using harmonic test functions. Then the upsampling operators are trained using a novel regularization technique that enables mid-scale detail learning without over-fitting. Oscillatory modes may be introduced to add dynamic details not captured by the coarse mesh simulation alone. Trained upsampling operators can then be advantageously applied to coarse mesh simulations of cloth to add realistic detail to the cloth in real-time three-dimensional applications.

16 Claims, 12 Drawing Sheets

(56) References Cited

OTHER PUBLICATIONS

Grinspun, E., Cirak, F., Schroder, P., and Ortiz, M. Non-Linear Mechanics and Collisions for Subdivision Surfaces. Tech. rep. 1999.

Kavan, L., Sloan, P.-P., and O'Sullivan, C. Fast and Efficient Skinning of Animated Meshes. Computer Graphics Forum 29, 3, to appear, 2010.

Lee, Y., Yoon, S.-E., Oh, S., Kim, D., and Choi, S. Multi-Resolution coth Simulation. Computer Graphics Forum (Pacific Graphics) 2010, 29, 7.

Loop, C. Smooth Subdivision Surfaces Based on Triangles. Master's Thesis, University of Utah, 1987.

Muller, M., Heidelberger, B., Hennix, M., and Ratcliff, J. Position Based Dynammics. J. Vis. Comun. Image Represent. 18 (Apr.) 2007, 109-118.

Muller, M., James, D., Stam, J., and Thurey, N. Real-Time Physics. In ACM SIGGRAPH Course Notes, 2008.

Muller, M., Hierarchical Position Based Dynamics. VRI-Phys. 2008.

Pighin, F., and Lewis, J.P. Practical Least-Squares for Computer Graphics. In SIGGRAPH '07: ACM SIGGRAPH 2007 courses, ACM, New York, NY, USA, 1-57.

Sorkine, O., Cohen-Or, D., Irony, D., and Toledo, S. Geometry-Aware Bases for Shape Approximation. IEEE Transactions on Visualization and Computer Graphics 11, 2, 171-180, 2005.

Wang, H., O'Brien, J., an Ramamoorthi, R. Multi-Resolution Isotropic Strain Limiting. ACM Trans. Graph. 29 (Dec.) 2010, 156:1-156:10.

Wardetzky, M., Mathur, S., Kalberer, F., and Grinspun, E. Discrete Laplace Operators: No Free Lunch. In Symposium on Geometry Processing, 2007, 33-37.

Zorin, D., Schroder, P., DeRose., A., Kobbelt, L., Levin, A., and Sweldens, W. Subdivision for Modeling and Animation. In ACM SIGGRAPH course notes, 2000.

Volodine, T., Vanderstraeten, D., and Roose, D. Smoothing of Meshes and Point Clouds Using Weighted Geometry-Aware Bases. Lecture notes in Comuter Science 4077, 2006, 687-693.

* cited by examiner

PHYSICS-INSPIRED UP SAMPLING FOR CLOTH SIMULATION

BACKGROUND

1. Field of the Invention

The present invention relates to the field of computer graphics and, in particular, to techniques for physics-inspired upsampling for cloth simulation.

2. Description of the Related Art

Improving realism is a key factor driving development of new generations of real-time computer graphics systems. Tremendous strides have been made improving realism with respect to lighting, surface features and texture, and dynamics for rigid objects. However, simulating the dynamics of cloth movement in real-time graphics systems has conventionally been limited to very coarse levels of detail because of hard real-time computational limitations.

Highly detailed cloth simulation can produce visually appealing animation, with a high degree of realism. Such improved realism can add materially to the overall quality of a real-time three-dimensional (3D) application. However, burdensome computational loads conventionally associated with highly detailed simulation techniques generally preclude these techniques from many popular real-time 3D applications, such as 3D games.

Cloth simulation in 3D games is useful in modeling the dynamics of clothing worn by characters within a scene and the dynamics of environmental items, such as curtains or flags, which may populate the scene. Certain games may pre-compute detailed cloth animation for a higher-degree of realism. However, generality of motion is lost with conventional pre-computation techniques. Other games may preserve generality of motion by implementing real-time cloth simulation. However, to maintain real-time performance, the games can typically only implement coarse cloth simulation.

As the foregoing illustrates, what is needed in the art is a realistic cloth simulation technique that is suitable for real-time 3D applications.

SUMMARY

One embodiment of the present invention sets forth a method for simulating cloth in a three-dimensional graphics environment. The method includes generating a first coarse-level cloth mesh based on at least one training frame that includes cloth animation data, generating a fine-level cloth mesh based on the at least one training frame and the first coarse-level cloth mesh, where the first coarse-level cloth mesh provides one or more tracking constraints for the fine-level cloth mesh. An upsampling operator is then computed based on the first coarse-level cloth mesh and the fine-level cloth mesh. Further, the upsampling operator defines a matrix configured to add fine-level detail to a second coarse-level cloth mesh dynamically generated within the three-dimensional graphics environment.

In some embodiments, a cloth object within an animated three-dimensional scene may be rendered to an apparently finer degree of detail without incurring a corresponding increase in computational load. In certain embodiments, relatively high quality real-time three-dimensional cloth simulation may be achieved with only a modest marginal increase in computational load versus a coarse-level cloth simulation.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the present invention provide an efficient technique for simulating cloth in a three-dimensional environment. The technique comprises a training phase, whereby an upsampling operator is generated, and an animation phase, whereby the upsampling operator is used to add realistic detail to a cloth mesh. In the training phase, a coarse-level cloth simulation is performed and a fine-level cloth simulation is performed based on tracking constraints from the coarse-level cloth simulation. The upsampling operator is generated based on the coarse-level cloth simulation and the fine-level cloth simulation. The upsampling operator may also include explicit oscillatory modes. In the animation phase, a coarse-level cloth simulation generates a coarse cloth mesh, which is upsampled to generate an upsampled cloth mesh. The upsampled cloth mesh includes geometric detail that defines a final cloth mesh, which may then be rendered as at least part of a graphics image.

System Overview

Figure 1:
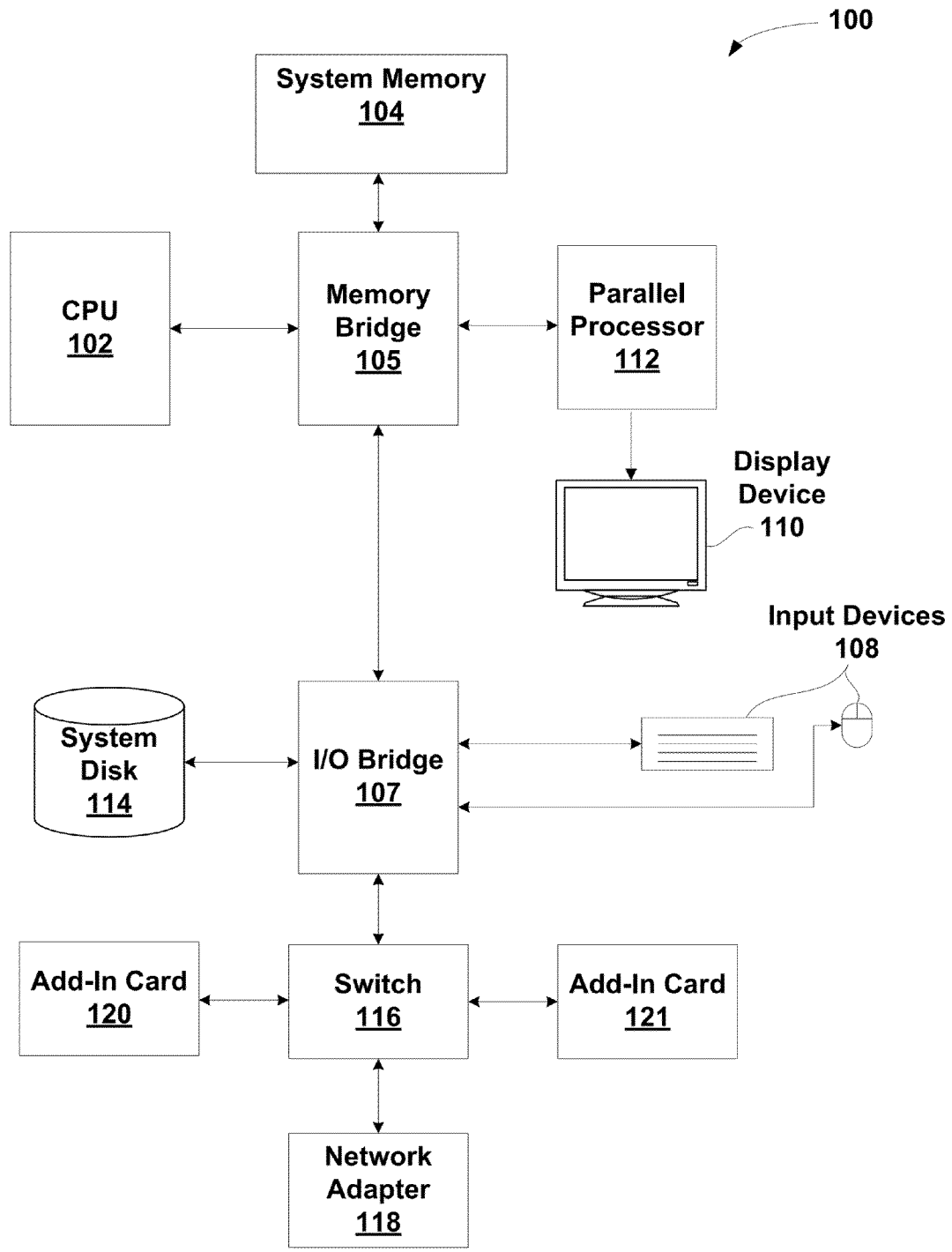
FIG. 1 is a block diagram of a system configured to implement one or more aspects of the present invention.

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional cathode ray tube (CRT), plasma, organic light-emitting diode (OLED), surface-conduction electron-emitter display (SED) or liquid-crystal display (LCD) based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, BLU-RAY, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including universal serial bus (USB) or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Upsampling for Cloth Simulation

Embodiments of the invention provide techniques for physically-based cloth simulation that uses upsampling operators to enrich a coarse mesh with mid-scale detail. The technique starts by pre-computing a pair of coarse and fine training simulations aligned with tracking constraints using harmonic test functions. Next, the upsampling operators are trained with a novel regularization method that enables learning of mid-scale details without over-fitting. Trained upsampling operators can then be advantageously applied to coarse mesh simulations of cloth to add realistic detail to the cloth in real-time three-dimensional applications.

Embodiments of the present invention implement certain techniques in a simulation architecture and workflow, including cloth simulation in general, subdivision, procedural wrinkle synthesis, and regularization. Embodiments of the invention do not rely on a particular cloth simulation technique; however, the technique should allow a fine-scale simulation to be constrained to track a coarse simulation. Different subdivision techniques may be implemented in conjunction with upsampling to provide appropriate visual detail. Procedural wrinkle synthesis can be implemented to enrich the appearance of meshes generated by coarse cloth simulators. Procedural wrinkle synthesis can be layered on top of embodiments of the present invention to provide greater details. Regularization is a method for solving ill-posed inverse problems by injection of additional assumptions (priors), with a popular method proposed by Tikhonov. Geometry-aware bases introduced by Sorkine can be considered as an application of Tikhonov regularization to mesh processing. These methods rely on discrete Laplace-Beltrami operators to express a smoothness prior. Embodiments of the present invention extend the concept of Tikhonov regularization to spatio-temporal domains of animation to provide animation-aware functions.

A linear upsampling operator mapping coarse points $P_c \in \mathbb{R}^{M \times 3}$ to fine points $P_f \in \mathbb{R}^{N \times 3}$ can be represented by a matrix $U \in \mathbb{R}^{N \times M}$ In typical embodiments, M is in the approximate range of one hundred to two hundred and N is on the order of five thousand to ten thousand. The upsampling operator can be expressed using matrix multiplication, as shown in Formula 1, below:

$$P_f = U p_c \quad (1)$$

This formulation is rotationally invariant and affine invariance may be guaranteed if the rows of U sum to 1.0. The set of matrices that satisfy this constraint of partition unity are denoted as $U_1 = \{U \in \mathbb{R}^{N \times M} : \Sigma_j U_{i,j} = 1 \forall_i = 1, \ldots, N\}$. Formula 1 operates on linear combinations of columns of U, and therefore, spatial smoothness of the columns is important for smooth results. These columns comprise an upsampling operator shape function, which may be visualized as a rectangular mesh. Exemplary shape functions are illustrated in FIGS. 2A-2C.

Figure 2A:
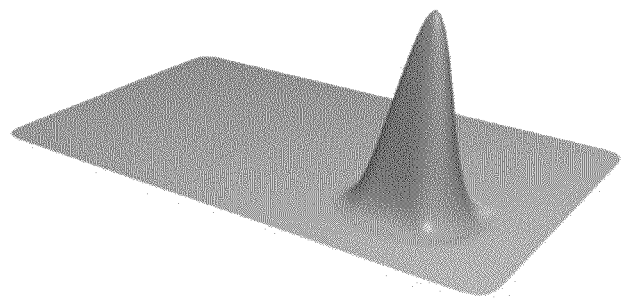
FIG. 2A illustrates a shape function for an upsampling operator, according to a Loop subdivision, according to one embodiment of the present invention.

FIG. 2A illustrates a shape function for an upsampling operator, according to a Loop subdivision. Persons skilled in the art will recognize Loop subdivision as a technique for adding refined geometric detail to meshes.

Figure 2B:
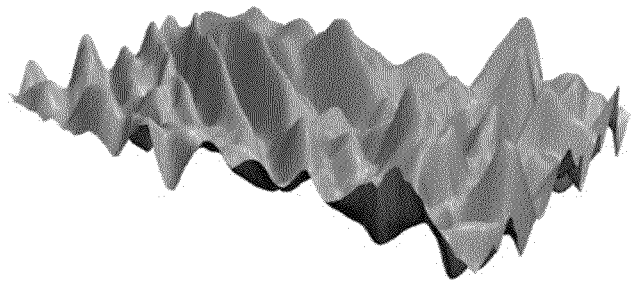
FIG. 2B illustrates a shape function for an upsampling operator, according to a non-regularized least squares fit of training data, according to one embodiment of the present invention.
Figure 2C:
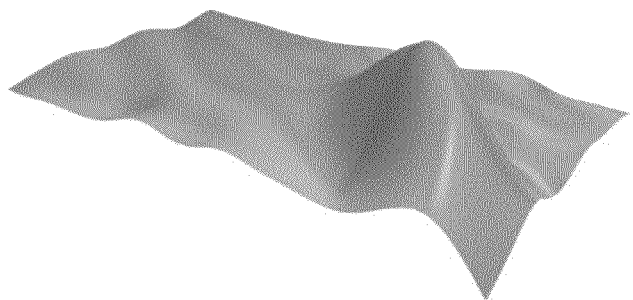
FIG. 2C illustrates a shape function for an upsampling operator, according to one embodiment of the present invention.

FIG. 2B illustrates a shape function for an upsampling operator, according to a non-regularized least squares fit of training data. Assuming a set of aligned training pairs ($P_{c,i}$, $P_{f,i}$) for i=1, ..., F, where F is a number of input frames used for training. Stacking both coarse and fine examples in to matrices $P_c \in \mathbb{R}^{M \times 3F}$ and $P_f \in \mathbb{R}^{N \times 3F}$ allows for a regression problem to be defined as formula 2, below:

$$\operatorname{argmin}_{U \in U_1} \|U p_c - P_f\| \quad (2)$$

The term $\|.\|$ denotes a Frobenius norm, which in one form comprises a constrained least squares problem that can be solved efficiently using known numerical methods. Persons skilled in the art will understand that, even with abundant training data, so that $P_c$ is numerically well conditioned, this approach often results in shape functions that are over-fit. This effect can be seen in FIG. 2B as chaotic bumps in the shape function. While optimally reconstructing training data from the input frames, even small perturbations away from the training data can lead to very non-smooth results.

FIG. 2C illustrates a shape function for an upsampling operator incorporating harmonic regularization, according to one embodiment of the present invention.

A smoothing term is implemented as a symmetric regularization matrix $R \in \mathbb{R}^{N \times N}$. To implement this smoothing term, the regression process is redefined from Formula 2 into Formula 3, given below:

$$\operatorname{argmin}_{U \in U_1} \|U p_c - P_f\| + \|RU\| \quad (3)$$

Figure 3A:
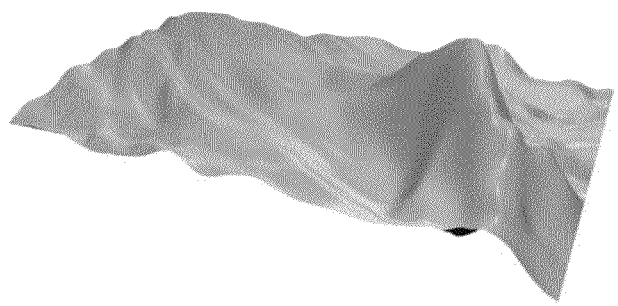
FIG. 3A illustrates an example shape function with Tikhonov regularization for $\alpha=1$, according to one embodiment of the present invention.
Figure 3B:
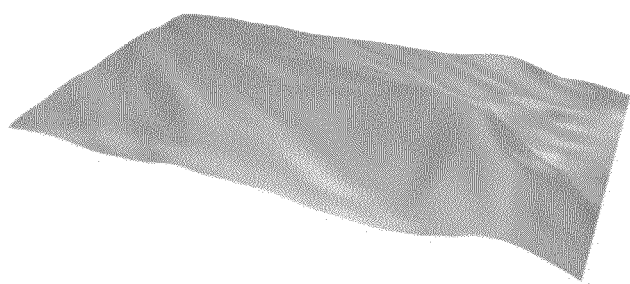
FIG. 3B illustrates an example shape function with Tikhonov regularization for $\alpha=2$, according to one embodiment of the present invention.

In preferred embodiments of the present invention, regularization matrix R acts on columns of U. In alternative embodiments employing Tikhonov regularization, regularization matrix R acts on rows of U. Regularization is accomplished via the argmin operator, in conjunction with regularization term ($\|UR\|$). Embodiments of the invention require shape functions (i.e., columns of U) to be smooth. A simple regularization matrix, $R := \alpha I$, $\alpha \in \mathbb{R}_+$, essentially provides equivalence to Tikhonov regularization while providing simplicity in solving each row of U, because each row may be solved independently. As shown in FIGS. 3A and 3B, greater smoothness may be obtained using the regularization matrix $R := \alpha L$, where $L \in \mathbb{R}^{N \times N}$ is a Laplace-Beltrami operator, discretized using cotangent weights.

FIG. 3A illustrates and example shape function with Tikhonov regularization for $\alpha=1$, according to one embodiment of the present invention.

FIG. 3B illustrates and example shape function with Tikhonov regularization for $\alpha=2$, according to one embodiment of the present invention.

Unfortunately, the Laplacian regularization term L introduces dependencies between rows of U and therefore the rows can no longer be solved for independently. The whole of U can be solved for using an aggregate linear system with N·M unknowns, but the resulting system is not very sparse and is generally more difficult and time consuming to solve. Furthermore, the regularization term aL sometimes does not prevent over-fitting of low frequencies, which can produce artifacts.

Embodiments of the present invention implement harmonic regularization to solve both low frequency over-fitting and time-consuming numerical solving associated with conventional regularization. One approach to harmonic regularization reformulates Laplacian regularization by factoring the Laplacian regularization term $L=Q\Lambda Q^T$ using Eigen decomposition, where $Q \in \mathbb{R}^{N \times N}$ is an orthonormal matrix containing mesh harmonic functions illustrated in FIGS. 4A-4D below, and $\Lambda$ is a diagonal matrix of Eigen values. The harmonic functions comprise an orthonormal basis which is substantially smooth.

Figure 4A:
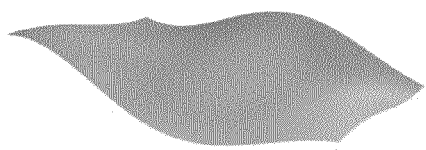
FIG. 4A illustrates a fifth order harmonic function of a flat rectangular mesh, according to one embodiment of the present invention.

FIG. 4A illustrates a fifth order harmonic function of a flat rectangular mesh, according to one embodiment of the present invention.

Figure 4B:
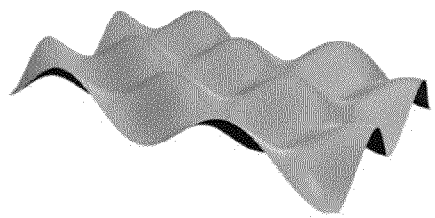
FIG. 4B illustrates a thirtieth order harmonic function of a flat rectangular mesh, according to one embodiment of the present invention.

FIG. 4B illustrates a thirtieth order harmonic function of a flat rectangular mesh, according to one embodiment of the present invention.

Figure 4C:
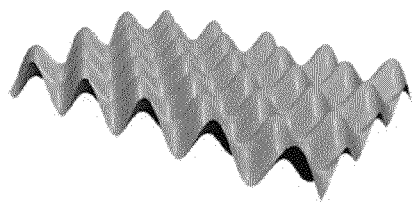
FIG. 4C illustrates a one hundredth order harmonic function of a flat rectangular mesh, according to one embodiment of the present invention.

FIG. 4C illustrates a one hundredth order harmonic function of a flat rectangular mesh, according to one embodiment of the present invention.

Figure 4D:
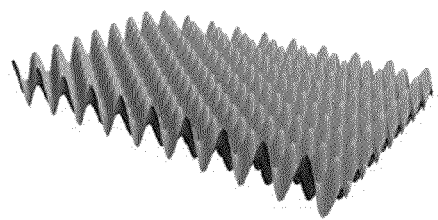
FIG. 4D illustrates a five hundredth order harmonic function of a flat rectangular mesh, according to one embodiment of the present invention.

FIG. 4D illustrates a five hundredth order harmonic function of a flat rectangular mesh, according to one embodiment of the present invention.

Because multiplication by an orthonormal matrix does not change a Frobenius norm, this factorization allows the Laplacian regularization term to be rewritten as shown below in Formula 4:

$$\|\alpha L U\| = \alpha \|LU\| = \alpha \|Q \Lambda Q^T U\| = \alpha \|\Lambda Q^T U\| \quad (4)$$

Similarly, the data term may be rewritten as shown below in Formula 5:

$$\|U p_c - P_f\| = \|Q^T U p_c - Q^T P_f\| \quad (5)$$

Substituting $\hat{U} = Q^T U$ allows the training problem to be reformulated as shown below in Formula 6:

$$\mathrm{argmin}_{\hat{U} \in Q^T(U_1)} \|\hat{U} p_c - Q^T P_f\| + \alpha \|\Lambda \hat{U}\| \quad (6)$$

The constrained least squares problem of Formula 6 is solved for $\hat{U} \in \mathbb{R}^{N \times N}$ to recover the upsampling operator as $U = Q \hat{U}$. The advantage of this formulation is that because $\Lambda$ is diagonal, the rows of U can be solved independently. Therefore, with precomputed Q, a numerical solver for U is simplified. On a conventional computer system, such as computer system 100, a numerical solver can complete in a few seconds, which is approximately two orders of magnitude faster than a conventional direct solver configured to solve Formula 3. A solution to Formula 6 can be solved efficiently, however, this problem formulation is prone to low-frequency over-fitting. In one embodiment, low-frequency over-fitting is overcome by using regularization matrix $R := Q \Gamma Q^T$, where $\Gamma \in \mathbb{R}^{N \times N}$ is a diagonal matrix generalizing a damping parameter $\alpha \in \mathbb{R}$ to N scalars, which leads to the problem formulation given below in Formula 7:

$$\mathrm{argmin}_{\hat{U} \in Q^T(U_1)} \|\hat{U} p_c - Q^T P_f\| + \|\Gamma \hat{U}\| \quad (7)$$

The simplest choice of $\Gamma := \alpha I$ is equivalent to Tikhonov regularization and no single $\alpha$ guarantees optimal results. For small values of $\alpha$, noisy high frequencies associated with high order harmonic functions are not sufficiently damped, while larger values of $\alpha$ quickly suppress desirable low frequencies. Therefore, a preferred embodiment of the present invention implements an independent damping term for each frequency using $\Gamma$.

A good choice for $\Gamma$ depends on characteristics of a specific set of training data and on a compromise between capturing and reproducing details of the training data for specific training cases and the ability for a trained upsampling operator to generalize. One simple approach to specifying $\Gamma$ is given as $\Gamma = \alpha I + \beta \Lambda$. However, superior results may be obtained using a polynomial of the form $\gamma_n = a(1+bn)^c$ for $n=1, \ldots, N$ and parameters $a,b,c \in \mathbb{R}$ specified to aggressively penalize high frequencies. Here, $\gamma_n$ is an element of $\Gamma$. The shape function for FIG. 2C was generated using such a profile, with a=0.8, b=10.0, c=4.0.

Any data-driven approach to training upsampling operators can typically only produce results as good as available training data. In this case, training data comprises pairs of coarse-scale and fine-scale meshes $(P_{c,i}, P_{f,i})$. Even with carefully selected mesh-independent simulation parameters, the two simulations will behave differently because the finer mesh can represent higher frequencies. Small differences, along with numerical errors, accumulate over time and cause the two simulations to bifurcate to different statues. Alignment is implemented to achieve good correlation between the two simulations and, therefore, higher-quality results. Alignment involves applying additional constraints on the fine-scale simulation, based on results from the coarse-level simulation. Different alignment techniques may be implemented without departing the scope and spirit of the present invention.

Because the coarse-scale mesh and fine-scale mesh both represent the same surface, they tend to be well aligned in a resting pose. This resting alignment enables a simple definition of barycentric interpolation $B \in \mathbb{R}^{N \times M}$ by projecting vertices from the fine-scale mesh onto vertices of the coarse-scale mesh. The barycentric interpolation of the coarse mesh can therefore be written as $Bp_c \in \mathbb{R}^{N \times 3}$. A tracking constant requires the fine-scale simulation state $P_f$ to match certain carefully chosen degrees of freedom from $Bp_c$ at each frame. Specifically, matrix $T \in \mathbb{R}^{T \times N}$ is defined, for T<<N row vectors of mass-weighed test functions. The tracking constant is a hard constraint on the fine simulation state $P_f$ that requires Formula 8 be satisfied:

$$T p_f = T B p_c \quad (8)$$

The rows of B form a partition of unity, and therefore the tracking constraint is invariant to simulations of rigid body transformations of $p_f$ and $p_c$. Enforcing Formula 8 is therefore straightforward with a position-based simulator as well as with a force-based simulator. In both cases the overall quality of training depends on test functions T. For example, a test function comprising a delta function (i.e., a matrix T with zeros except for exactly on 1.0 vale in each row), will generally result in a fine-scale simulation exhibiting objectionable tugging artifacts. A better test function is proposed by Bergou, which produces much more natural tracking, but does still exhibit bubbling artifacts, as shown below in FIG. 5A.

Figure 5A:
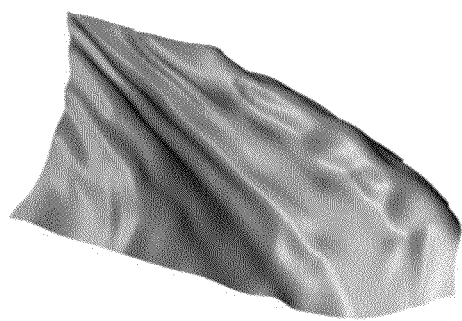
FIG. 5A illustrates a fine mesh tracked with eighty test functions obtained using clustering, according to one embodiment of the present invention.

FIG. 5A illustrates a fine mesh tracked with eighty test functions obtained using clustering, according to one embodiment of the present invention.

Figure 5B:
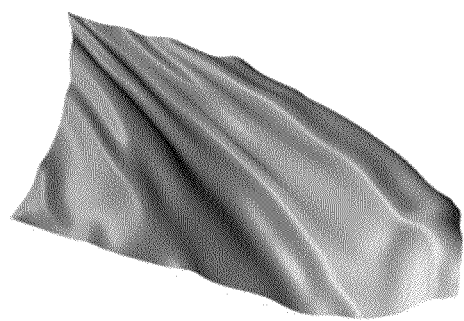
FIG. 5B illustrates a fine mesh tracked with eighty test functions obtained using harmonic test functions, according to one embodiment of the present invention.

FIG. 5B illustrates a fine mesh tracked with eighty test functions obtained using harmonic test functions, according to one embodiment of the present invention. As shown, these harmonic test functions yield high quality results without perceptible artifacts. These results can be readily understood by observing that the tracking constraint of Formula 8 requires the orthogonal projections of $p_f$ and $Bp_c$ on the row space of T to match. The component of $p_f$ in the nullspace of T is not influenced by the tracking constraint. In other words, corresponding degrees of freedom behave exactly as dictated by physics. Since tracking is used to restore fine-scale detail missing in the coarse simulation, the row space of T should contain only low frequencies, leaving higher frequencies undisturbed.

Figure 6A:
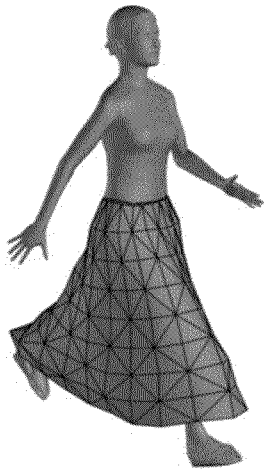
FIG. 6A illustrates cloth simulation using coarse simulation, according to one embodiment of the present invention.

FIG. 6A illustrates cloth simulation using coarse simulation, according to one embodiment of the present invention. The mesh associated with the cloth of a figure's skirt is illustrated as black segments connecting mesh vertices.

Figure 6B:
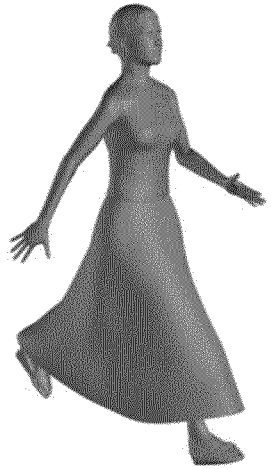
FIG. 6B illustrates cloth simulation using coarse simulation and mesh subdivision, according to one embodiment of the present invention.

FIG. 6B illustrates cloth simulation using coarse simulation and mesh subdivision. The subdivision creates additional geometry, but the additional geometry is not directly part of physics simulations for the mesh.

Figure 6C:
FIG. 6C illustrates cloth simulation using coarse simulation with trained upsampling, according to one embodiment of the present invention.

FIG. 6C illustrates cloth simulation using coarse simulation with trained upsampling, according to one embodiment of the present invention. This cloth simulation produces improved fine detail of cloth dynamics not present in the simulation of FIGS. 6A-B, without the computational burden of a fine-scale cloth simulation, shown below in FIG. 6D.

Figure 6D:
FIG. 6D illustrates reference cloth simulation based on fine-scale simulation.

FIG. 6D illustrates reference cloth simulation based on fine-scale simulation. Upsampling operators used to generate the cloth simulation of FIG. 6C are trained on a set of coarse-scale simulation data in conjunction with fine-scale simulation data, such as the frame of fine-scale simulation data shown here.

Figure 7A:
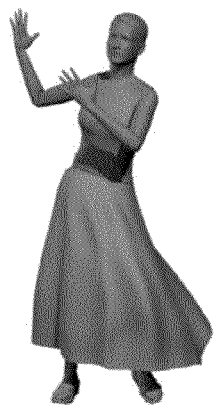
FIG. 7A illustrates cloth simulation for a dancing figure that was trained from walking dynamics.

FIG. 7A illustrates cloth simulation for a dancing figure that was trained from walking dynamics. The cloth movement is qualitatively reasonable for the skirt of the dancing figure, illustrating generalization properties of the upsampling operator disclosed herein.

Figure 7B:
FIG. 7B illustrates fine-scale cloth simulation for the dancing figure.

FIG. 7B illustrates fine-scale cloth simulation for the dancing figure. As shown, diagonal wrinkles from torsional twists visible in this fine-scale simulation are not visible in FIG. 7A because the torsional twists are not captured in training that is limited to walking dynamics for the upsampling operator U.

Figure 7C:
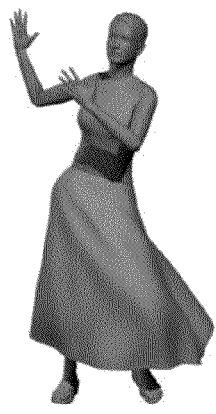
FIG. 7C illustrates cloth simulation of the dancing figure based on a re-trained upsampling operator for dancing dynamics.

FIG. 7C illustrates cloth simulation of the dancing figure based on a re-trained upsampling operator for dancing dynamics. As shown, torsional twists are captured by the upsampling operators once retrained for dancing dynamics. Importantly, while the upsampling operator U, defined herein, generalizes well, still better results may be achieved for different types of motion by training different, corresponding upsampling operators U for specific types of motion. For example, within the same 3D application, a first upsampling operator U may be used for walking behaviors, while a second upsampling operator U may be used or dancing behaviors.

With training data generated using tracking, as described above, coarse vertex positions $p_c$ are generally good predictors of fine vertex positions $P_f$. However, an exception occurs in scenarios involving persistent external forcing, such as when environmental cloth (flags, sails, etc.) is subjected to strong wind. In this case, even tracked simulation often exhibits traveling waves that cannot be sufficiently modeled using $p_c$. In such scenarios, the persistent external forcing can be captured using oscillatory modes, which model characteristic traveling wave components most prominent in the normal direction to reconstructed surface $Up_c$. In one embodiment, only displacements in the normal direction, denoted $D \in \mathbb{R}^{N \times F}$, are considered. In alternative embodiments, tangential directions may also be similarly modeled. A given oscillatory mode of frequency $\theta$ is denoted by a matrix $\Omega(\theta) \in \mathbb{R}^{2 \times F}$ where each column contains $(\sin(n\theta), \cos(n\theta))^T$, for n=1, ..., F. Training for oscillatory modes involves solving Formula 9, given below for optimal values of E and $\theta$:

$$\operatorname{argmin}_{E,\theta} \|D - E\Omega(\theta)\| \qquad (9)$$

Once optimal values of E and $\theta$ are found, the process can be repeated on deflated versions of D, D-E$\Omega(\theta)$, until a corresponding Frobenius norm decreases below a given threshold. To find a suitable $\theta$, autocorrelation on the columns of D is performed to discover the strongest periodic component of an associated motion signal. Once $\theta$ is determined, E can be calculated using linear regression. Overlaying oscillatory modes is illustrated below in FIGS. 8A and 8B.

Figure 8A:
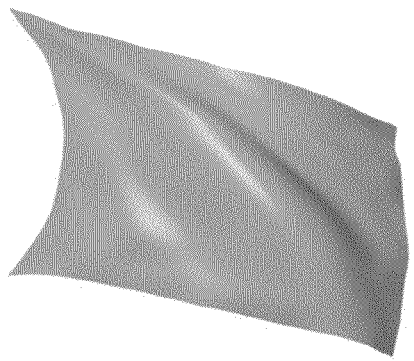
FIG. 8A illustrates a flag flapping in a wind that is upsampled without explicit oscillatory modes.

FIG. 8A illustrates a flag flapping in a wind that is upsampled without explicit oscillatory modes.

Figure 8B:
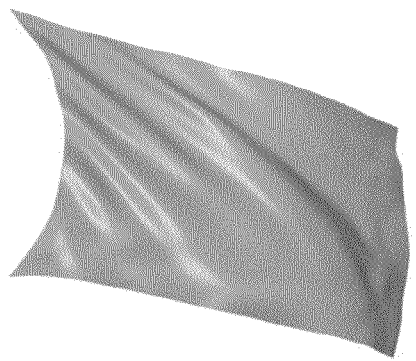
FIG. 8B illustrates a flag flapping in a wind that is upsampled with explicit oscillatory modes.

FIG. 8B illustrates a flag flapping in a wind that is upsampled with explicit oscillatory modes. As shown, the explicit oscillatory modes introduce an appearance of traveling waves via normal, periodic surface displacement, thereby mimicking naturally occurring traveling waves on a physical flag.

Figure 9A:
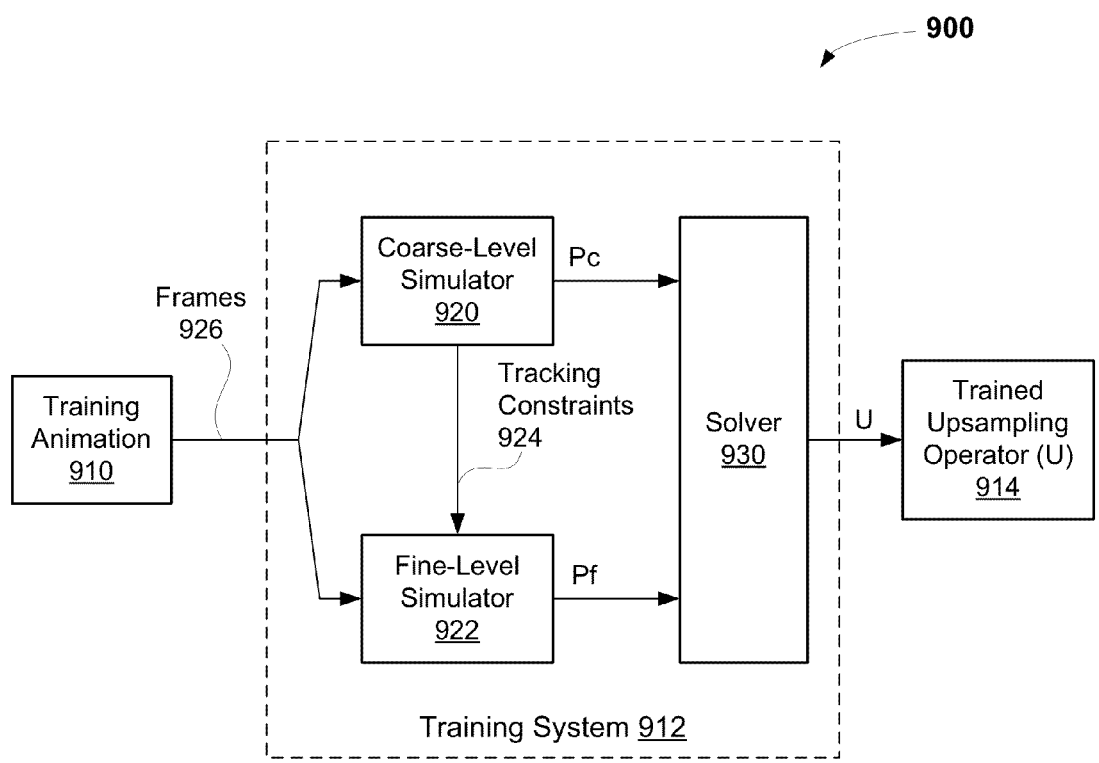
FIG. 9A illustrates a cloth simulation workflow for generating a trained upsampling operator, according to one embodiment of the present invention.

FIG. 9A illustrates a cloth simulation workflow 900 for generating a trained upsampling operator 914, according to one embodiment of the present invention. A training animation 910 that is representative of a target real-time dynamics provides stimulus frames 926 to a training system 912. The training system 912 comprises a coarse-level cloth simulator 920, a fine-level cloth simulator 922, and a solver 930. The solver 930 generates the trained upsampling operator 914.

The stimulus frames 926 are transmitted to the coarse-level cloth simulator 920 and the fine-level cloth simulator 922. As described previously, tracking constraints 924 constrain the fine-level cloth simulator 922 to generating a surface that is generally representative of a coarse-level mesh generated by the coarse-level simulator 920. A solver 930 solves a fitting problem, such as posed by Formula 7, to optimize parameters in U. The resulting matrix U comprises an upsampling operator trained based on the stimulus frames. Therefore, the output of the solver 930 comprises the trained upsampling operator 914. Any technically feasible cloth simulators may be implemented for the coarse-level cloth simulator 920 and fine-level cloth simulator 922, and any technically feasible tracking technique may be implemented without departing the scope and spirit of embodiments of the present invention. Furthermore, any technically feasible solver 930 may be implemented without departing the scope and spirit of embodiments of the present invention.

Figure 9B:
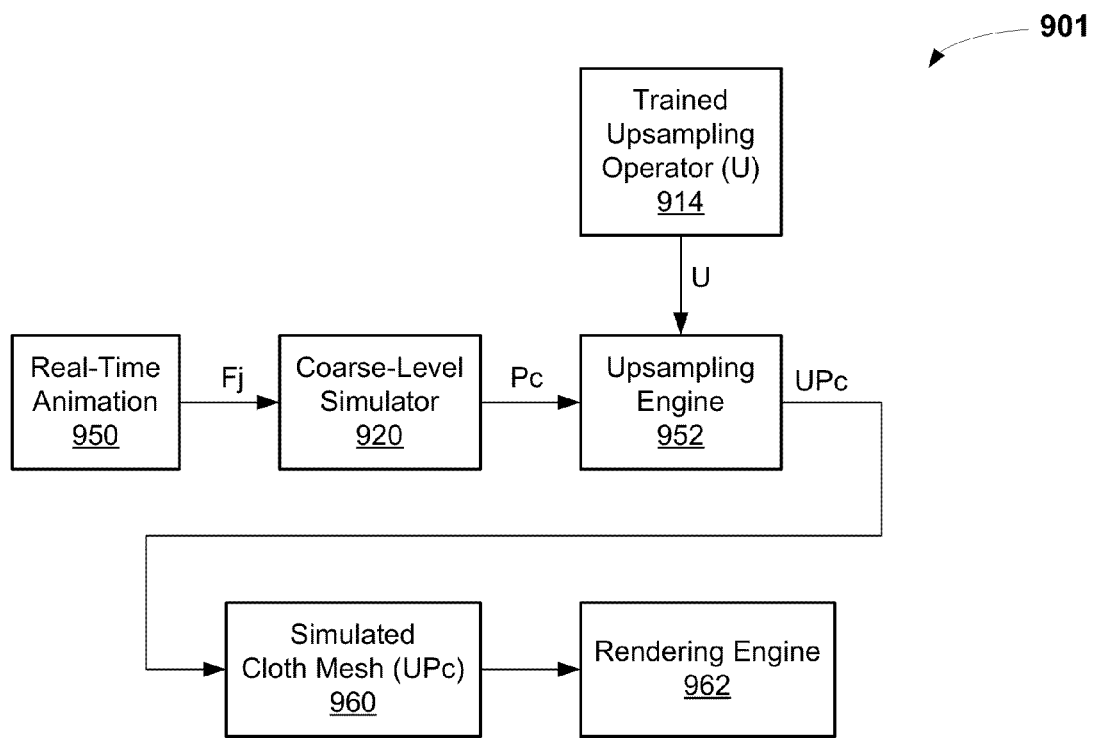
FIG. 9B illustrates a workflow for real-time 3D rendering based on the trained upsampling operator, according to one embodiment of the present invention.

FIG. 9B illustrates a workflow 901 for real-time 3D rendering based on the trained upsampling operator 914, according to one embodiment of the present invention. A real-time animation engine 950 generates frames Fj of animation data that include at least frames of cloth simulation input data. The real-time animation engine 950 may comprise a kinematic simulator, a physics engine, a game animation engine, or any other technically feasible computation engine configured to generate input data for cloth simulation. The coarse-level cloth simulator 920 generates a coarse-level simulated cloth mesh (Pc) based on the cloth simulation input data. The previously generated trained upsampling operator (U) 914 and the coarse-level simulated cloth mesh (Pc) are processed by an upsampling engine 952 to generate a simulated cloth mesh (UPc) 960. The simulated cloth mesh 960 represents an upsampled version of the coarse-level simulated cloth mesh (Pc), incorporating greater detail via the trained upsampling operator 914. In one embodiment, the upsampling engine 952 comprises a matrix multiplier engine. Any technically feasible technique may be used to implement the upsampling operator 914 without departing the scope and spirit of the present invention. The simulated cloth mesh 960 is transmitted to a rendering engine 962 to generate an image from the simulated cloth mesh 960. Sequential images from sequential frames Fj may be generated accordingly.

Figure 10:
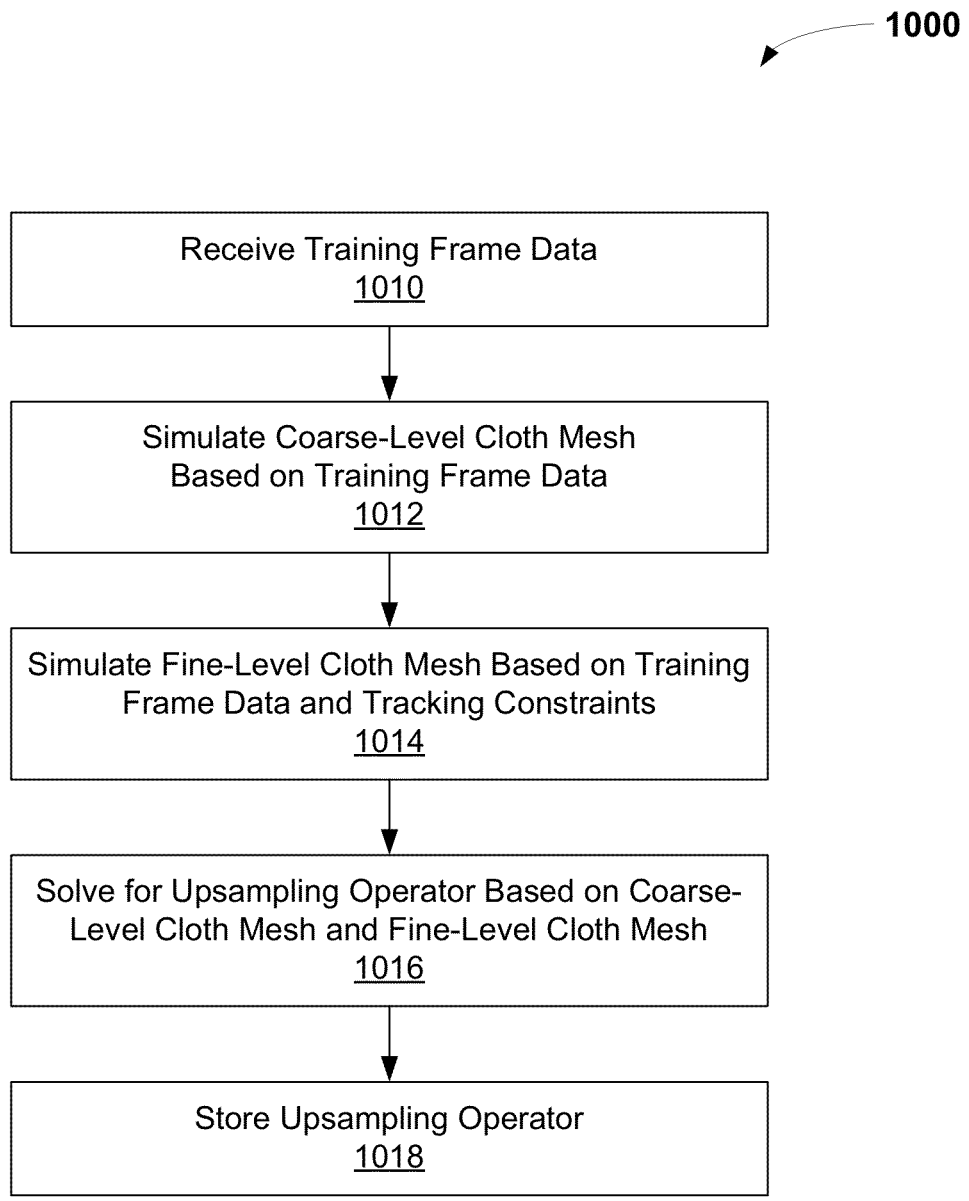
FIG. 10 is a flow diagram of method steps for generating a trained upsampling operator for cloth simulation, according to one embodiment of the present invention.

FIG. 10 is a flow diagram of method steps 1000 for generating a trained upsampling operator 914 for cloth simulation, according to one embodiment of the present invention. Although the method steps are described in conjunction with the systems of FIGS. 1, 9A and 9B, persons skilled in the art will understand that any systems configured to perform the method steps is within the scope of the present invention.

The method begins in step 1010, where a training system receives training frame data. In one embodiment, the training system comprises training system 912 of FIG. 9A and the training frame data comprises frames 926. The training system 912 may execute on computer system 100 of FIG. 1, or any technically feasible computing platform. In step 1012, a coarse-level cloth simulator within the training system simulates a coarse-level cloth mesh based on the training frame data to produce a coarse-level cloth mesh. In step 1014, a fine-level cloth simulator within the training system simulates a fine-level cloth mesh based on the training frame data and tracking constraints from the coarse-level cloth mesh to produce a fine-level cloth mesh that is constrained to the coarse-level cloth mesh.

In step 1016, a solver within the training system solves for an upsampling operator based on the coarse-level cloth mesh and fine-level cloth mesh. In one embodiment, the upsampling operator comprises a matrix, which, when multiplied against an upsampled version of the coarse-level cloth mesh, produces an upsampled cloth mesh having shape and surface features substantially similar to the fine-level cloth mesh. In one embodiment, the solver implements a harmonic regularization technique, as expressed in Formula 7. In a preferred embodiment, the solver implements explicit oscillatory modes, as expressed in Formula 9. The method terminates in step 1018, where the training system saves the upsampling operator.

Figure 11:
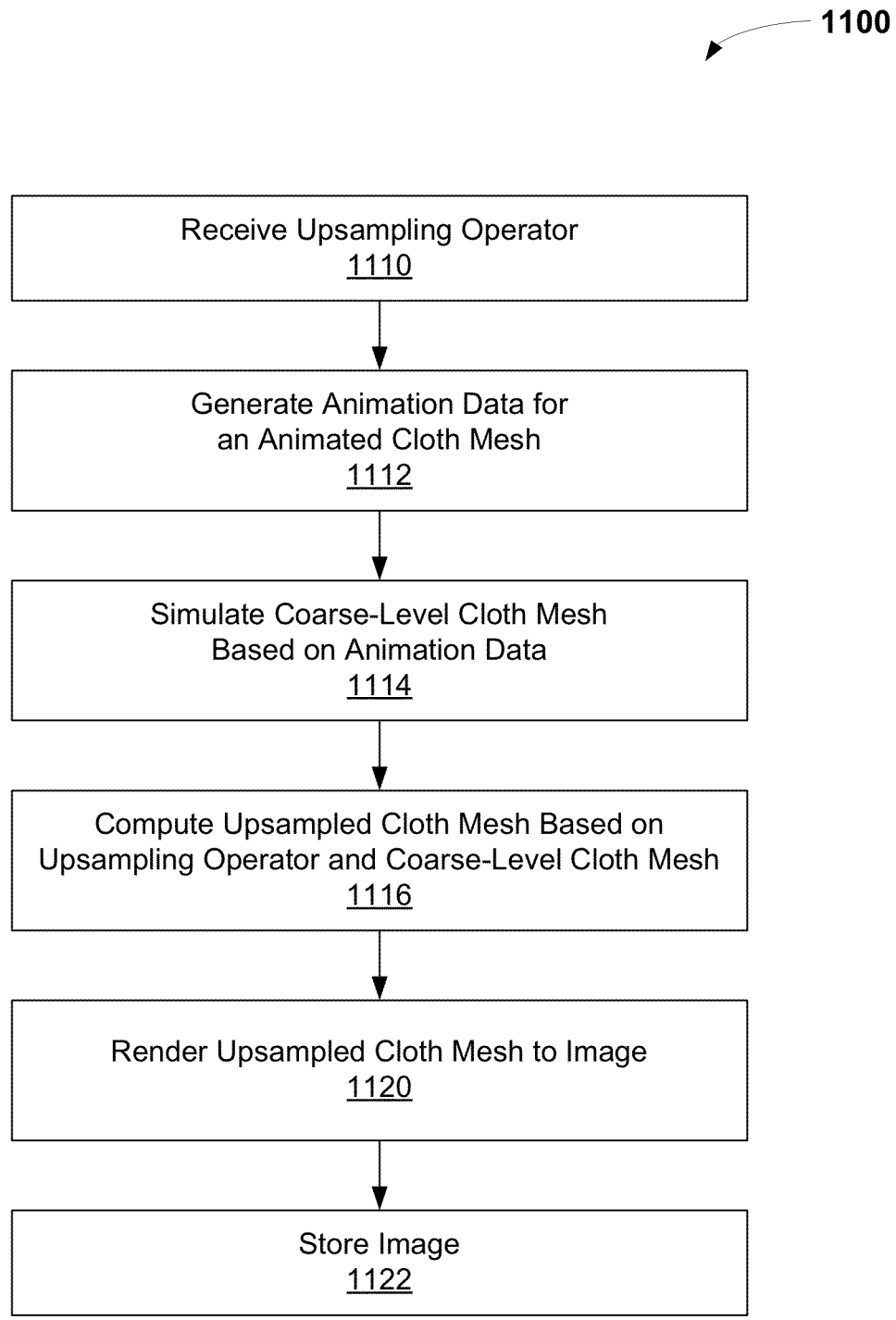
FIG. 11 is a flow diagram of method steps for simulating cloth based on the trained upsampling operator, according to one embodiment of the present invention.

FIG. 11 is a flow diagram of method steps 1100 for simulating cloth based on the trained upsampling operator 914, according to one embodiment of the present invention. Although the method steps are described in conjunction with the systems of FIGS. 1, 9A and 9B, persons skilled in the art will understand that any systems configured to perform the method steps is within the scope of the present invention.

The method begins in step 1110, where a computer system, such as computer system 100, a game console, or any other technically feasible computation platform receives at least the upsampling operator 914 of FIG. 9A. In step 1112, an animation engine executing on the computer system generates frame data comprising animation input to a coarse-level cloth simulator, such as coarse-level simulator 920 of FIG. 9B. In step 1114, the coarse-level cloth simulator generates a cloth mesh based on the animation input. In step 1116, an upsampling engine, such as upsampling engine 952, upsamples the cloth mesh and applies the upsampling operator 914 to generate an upsampled cloth mesh. In step 1120, the upsampled cloth mesh is rendered to an image. Any technically feasible technique may be implemented to render the image. The method terminates in step 1122, where the rendered image is stored. The rendered image may be stored as part of an overall image being rendered for immediate real-time display or for later use.

In sum, embodiments of the present invention provide an efficient technique for simulating cloth in a three-dimensional environment. The technique comprises a training phase, whereby an upsampling operator is generated, and an animation phase, whereby the upsampling operator is used to add realistic detail to a cloth mesh. In the training phase, a coarse-level cloth simulation is performed and a fine-level cloth simulation is performed based on tracking constraints from the coarse-level cloth simulation. The upsampling operator is generated based on the coarse-level cloth simulation and the fine-level cloth simulation. The upsampling operator may also include explicit oscillatory modes. In the animation phase, a coarse-level cloth simulation generates a coarse cloth mesh, which is upsampled to generate an upsampled cloth mesh. The upsampled cloth mesh includes geometric detail that defines a final cloth mesh, which may then be rendered as at least part of a graphics image.

One advantage of embodiments of the present invention is that a cloth object within an animated three-dimensional scene may be rendered to an apparently finer degree of detail without incurring a corresponding increase in computational load. In certain embodiments, relatively high quality real-time three-dimensional cloth simulation may be achieved with only a modest marginal increase in computational load versus a coarse-level cloth simulation.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method, comprising:
receiving at least one training frame that includes training animation data representative of target real-time cloth dynamics;
simulating a first coarse-level cloth mesh of a given surface, based on the training animation data;
simulating a fine-level cloth mesh of the given surface, based on the training animation data and one or more tracking constraints, wherein the one or more tracking constraints constrain the simulation of the fine-level cloth mesh to generating a surface representative of the first coarse-level cloth mesh;
computing, by operation of one or more computer processors, a linear upsampling operator based on the first coarse-level cloth mesh and the fine-level cloth mesh of the given surface;
processing a second coarse-level cloth mesh, distinct from the first coarse-level cloth mesh, using the linear upsampling operator to create a second fine-level cloth mesh of the given surface; and rendering one or more images depicting the second fine-level cloth mesh.

2. The method of claim 1, wherein processing the second coarse-level cloth mesh using the linear upsampling operator further comprises:
   collecting a set of training animation data of the first coarse-level cloth mesh,
   collecting a set of training animation data of the first fine-level cloth mesh,
   aligning the set of training animation data of the first fine-level cloth mesh with the set of training animation data of the first coarse-level cloth mesh,
   arranging the set of training animation data of the first coarse-level cloth mesh into a first matrix,
   arranging the set of training animation data of the first fine-level cloth mesh into a second matrix, and
   modifying the processing of the second coarse-level cloth mesh by computing a first argmin for a first Frobenius norm of a matrix difference between, a matrix product of the linear upsampling operator and the first matrix, and the second matrix.

3. The method of claim 2, wherein processing the second coarse-level cloth mesh using the linear upsampling operator further comprises:
   selecting a regularization matrix,
   computing a second Frobenius norm of a matrix product of the selected regularization matrix and the linear upsampling operator, and
   refining the linear upsampling operator by computing a matrix sum of the first argmin and the second Frobenius norm.

4. The method of claim 3, wherein the selected regularization matrix comprises a Tikhonov regularization matrix.

5. The method of claim 3, wherein the selected regularization matrix comprises a harmonic regularization matrix.

6. The method of claim 2, wherein computing the linear upsampling operator further comprises computing an explicit oscillatory mode.

7. The method of claim 6, wherein computing the explicit oscillatory mode comprises computing a second argmin for a third Frobenius norm of a matrix difference between a displacement matrix and a second matrix product.

8. A non-transitory computer-readable medium including instructions that, when executed by a processing unit, cause the processing unit to simulate cloth in a three-dimensional graphics environment, by performing an operation comprising:
   receiving at least one training frame that includes training animation data representative of target real-time cloth dynamics;
   simulating a first coarse-level cloth mesh of a given surface, based on the training animation data;
   simulating a fine-level cloth mesh of the given surface, based on the training animation data and one or more tracking constraints, wherein the one or more tracking constraints constrain the simulation of the fine-level cloth mesh to generating a surface representative of the first coarse-level cloth mesh;
   computing, by operation of one or more computer processors, a linear upsampling operator based on the first coarse-level cloth mesh and the fine-level cloth mesh of the given surface;
   processing a second coarse-level cloth mesh, distinct from the first coarse-level cloth mesh, using the linear upsampling operator to create a second fine-level cloth mesh of the given surface; and rendering one or more frames depicting the second fine-level cloth mesh.

9. The non-transitory computer-readable medium of claim 8, wherein processing the second coarse-level cloth mesh using the linear upsampling operator further comprises:
   collecting a set of training animation data of the first coarse-level cloth mesh,
   collecting a set of training animation data of the first fine-level cloth mesh,
   aligning the set of training animation data of the first fine-level cloth mesh with the set of training animation data of the first coarse-level cloth mesh,
   arranging the set of training animation data of the first coarse-level cloth mesh into a first matrix,
   arranging the set of training animation data of the first fine-level cloth mesh into a second matrix, and
   modifying the processing of the second coarse-level cloth mesh by computing a first argmin for a first Frobenius norm of a matrix difference between, a matrix product of the linear upsampling operator and the first matrix, and the second matrix.

10. The non-transitory computer-readable medium of claim 9, wherein processing the second coarse-level cloth mesh using the linear upsampling operator further comprises:
    selecting a regularization matrix,
    computing a second Frobenius norm of a matrix product of the selected regularization matrix and the linear upsampling operator, and
    refining the linear upsampling operator by computing a matrix sum of the first argmin and the second Frobenius norm.

11. The non-transitory computer-readable medium of claim 10, wherein the selected regularization matrix comprises a Tikhonov regularization matrix.

12. The non-transitory computer-readable medium of claim 10, wherein the selected regularization matrix comprises a harmonic regularization matrix.

13. The non-transitory computer-readable medium of claim 9, wherein computing the linear upsampling operator further comprises computing an explicit oscillatory mode.

14. The non-transitory computer-readable medium of claim 13, wherein computing the explicit oscillatory mode comprises computing a second argmin for a third Frobenius norm of a matrix difference between a displacement matrix and a second matrix product.

15. A computer-implemented method for simulating cloth in a three-dimensional graphics environment, the method comprising:
    receiving at least one training frame that includes training animation data representative of target real-time cloth dynamics;
    generating a first coarse-level cloth mesh of a given surface, based on the training animation data;
    generating a fine-level cloth mesh of the given surface, based on the training animation data and one or more tracking constraints, wherein the one or more tracking constraints constrain the simulation of the fine-level cloth mesh to generating a surface representative of the first coarse-level cloth mesh;
    computing, by operation of one or more computer processors, a linear upsampling operator, based on the first coarse-level cloth mesh and the fine-level cloth mesh of the given surface;
    generating a second coarse-level cloth mesh, distinct from the first coarse-level cloth mesh; and generating a second fine-level cloth mesh of the given surface based on the second coarse-level cloth mesh and the linear upsampling operator;

rendering one or more frames depicting the second fine-level cloth mesh.

16. A computer-implemented method for simulating cloth in a three-dimensional graphics environment, the method comprising:

receiving at least one training frame that includes training animation data representative of target real-time cloth dynamics;

simulating a first coarse-level cloth mesh of a given surface, based on the training animation data;

simulating a fine-level cloth mesh of the given surface, based on the training animation data and one or more tracking constraints, wherein the one or more tracking constraints constrain the simulation of the fine-level cloth mesh to generating a surface representative of the first coarse-level cloth mesh;

computing, by operation of one or more computer processors, a linear upsampling operator based on the first coarse-level cloth mesh and the fine-level cloth mesh of the given surface;

processing a second coarse-level cloth mesh, distinct from the first coarse-level cloth mesh, using the linear upsampling operator to create a second fine-level cloth mesh of the given surface; and rendering one or more frames depicting the second fine-level cloth mesh.

* * * * *